United States Patent
Berger

(10) Patent No.: US 6,550,926 B2
(45) Date of Patent: Apr. 22, 2003

(54) TELESCOPING PROBE WITH INTERCHANGEABLE MIRRORS AND LIGHT EMITTING DIODES INCLUDING ULTRAVIOLET

(76) Inventor: Leon Berger, 608 Amber Dr., Huntington Beach, CA (US) 92648

( * ) Notice: Subject to any disclaimer, the term of this patent is extended or adjusted under 35 U.S.C. 154(b) by 0 days.

(21) Appl. No.: 10/113,450

(22) Filed: Mar. 27, 2002

(65) Prior Publication Data

US 2002/0171955 A1 Nov. 21, 2002

Related U.S. Application Data

(60) Provisional application No. 60/280,720, filed on Mar. 30, 2001.

(51) Int. Cl.[7] .............................................. G02B 7/182
(52) U.S. Cl. ....................... 359/882; 359/875; 359/876; 359/877
(58) Field of Search ................................. 359/882, 875, 359/876, 877

(56) References Cited

U.S. PATENT DOCUMENTS

| | | | | |
|---|---|---|---|---|
| 1,036,000 A | * | 8/1912 | Pease | 362/139 |
| 5,428,484 A | | 6/1995 | Baker | 359/872 |
| 5,458,486 A | * | 10/1995 | Ballard | 433/30 |
| D379,656 S | | 6/1997 | Reynolds | D24/139 |
| 5,654,824 A | * | 8/1997 | Tarr et al. | 359/507 |
| 5,906,487 A | * | 5/1999 | Carr | 433/30 |
| 6,068,379 A | * | 5/2000 | Kempf | 359/838 |
| 6,069,340 A | * | 5/2000 | DeCanio | 219/124.34 |
| 6,210,009 B1 | * | 4/2001 | Daly | 359/882 |
| 6,302,550 B1 | * | 10/2001 | Krieg | 359/879 |

* cited by examiner

Primary Examiner—Mohammad Sikder

(57) ABSTRACT

A professional hand held probe device, having an optional telescoping feature. This probe as used in an inspection device can be of a fixed length or telescoping to any desired length. This probe has a frame assembly at the distal end that is remotely adjustable by a button on the handle section and is configured to accept mirrors of various diopters. This frame is also configured to accept light emitting diodes of different wave lengths witch includes ultra violet light. The light emitting diodes are energized by batteries in the handle, witch handles three AAA batteries supplying a voltage in excess of what is needed for the light emitting diodes, a regulating device is used to control the voltage, this enables the user to insert either alkaline or ni-cad batteries. provision for an outside power source is also provided for extended periods of use. A note of importance is that both the remote operation and the light emitting diodes are infinitely engaged, meaning that the light will work at any point of extension, also the remote operating feature will also work at any point of extension.

3 Claims, 3 Drawing Sheets

TELESCOPING PROBE WITH INTERCHANGEABLE MIRRORS AND LIGHT EMITTING DIODES INCLUDING ULTRAVIOLET

This application claims the benefit of provisional application serial No. 60/280,720 filed Mar. 30 2001

FIELD OF THE INVENTION

The present invention is directed to an inspection mirror, particularly to a mirror that is extendible, remotely adjustable, with interchangeable mirrors and light wavelengths.

BACKGROUND OF THE RELATED ART

Small mirrors mounted on shafts are used to inspect areas that are not within the line of sight, a similar type of mirror is used by dentists to inspect areas of the mouth and teeth that can not otherwise be seen.

Improvements such as telescoping shafts, some with pen lights attached to the shafts, some with light conducting plastic surrounding the mirror, others with flexible shafts, none of them do an efficient job.

The most common inspection procedures are visual, dimensional, X-ray, magnetic particle and florescent penetrant.

Parts that are machined, forged or cast for the aerospace and nuclear industries are highly complex in form, they require processing such as welding, heat treating, chemical cleaning, plating and various coatings for preservation of the material.

These areas are of various colors and textures, cracks, laps, pinholes, blisters and ill general poor adhesions may not be within the line of sight, yet they create a dangerous situation compromising the quality of the part. The ability to remotely adjust the angle of the mirror saves time and allows the comparison of different areas without having to withdraw the tool.

The various colors and textures create a need for multiple light wavelengths to better contrast the imperfections, being able to interchange mirrors to increase the magnification factor aid in finding small imperfections, in the case of fluorescent penetrant inspection an ultra violet light is made available.

The present invention is intended to meet all these requirements and differs in many respects from what is known in prior art.

THUS FOR EXAMPLE, U.S. PAT. No. 5,428,484 TO BAKER 1995 titled MOVEABLE HAND-HELD, LIGHTED MIRROR shows a hand held telescoping device where a ordinary flash light is mounted near the distal end and the mirror is manually adjusted to direct the light to the desired area. This system can achieve a great view of the flashlight bulb, the reflector and lens mingled with a view of the bore to be inspected The assembly seems to be mounted on a modified collapsible radio antennae.

U.S. PAT. No. D0379,656 To REYNOLDS Dated 1997 Shows a mirror mounted at the distal end of a portable radio antennae, other than compact size when collapsed there is no particular advantage.

Although there is some prior art relating to telescoping and lighted mirrors none is considered any more relevant to the present invention than that discussed above.

SUMMARY

In accordance with the present invention a telescoping probe consists of a handle containing a power source and an electronic voltage regulating device, a type of electrical switch to turn off and on the voltage as necessary, a thumb activated device protruding from the handle to actuate the mirror. An electrical conducting coaxial arm in single or nesting sections, comprising an arm assembly, an insulating material separating the inner and outer section of the coaxial arm. The distal end of the coaxial arm assembly made part of a mechanism that allows the mirror to move up and down on a plane parallel to the coaxial shaft, necessary conductors placed strategically to allow regulated current to the light emitting diodes, a means to change as necessary the light emitting diodes and mirrors.

OBJECTS OF THE INVENTION

A principal object of this invention is to provide a means to inspect an area that is normally out of the line of sight.

A related object of this invention is to have the mirror assembly operated remotely.

Another object of this invention is to have interchangeable light emitting diodes.

Another object of this invention is to have the various light waves directly illuminate the area to be inspected.

Accordingly yet to another aspect of this invention is to provide a means to extend the length of the probe while maintaining electrical contact at any desired length.

Accordingly yet to another aspect of this invention to provide the ability to operate the remote mechanism while manipulating the extensible shaft in either direction.

Accordingly yet to another aspect of this invention to provide a means to make an ultra violet light readily available.

These and other related objects are realized by providing in a preferred embodiment of this invention a truly professional inspection device.

It is to be noted that the appended drawings illustrate only preferred embodiments and are therefore not to be considered limiting of it's scope, for this invention may admit to other equally effective embodiments.

| EFFECTIVE EMBODIMENTS | |
|---|---|
| 10 | outer section of arm |
| 12 | handle |
| 14 | batteries |
| 16 | voltage regulator |
| 18 | electrical switch |
| 20 | connection for outside power |

-continued

EFFECTIVE EMBODIMENTS

| | |
|---|---|
| 22 | handle cap |
| 24 | elongated slot |
| 26 | operating button |
| 28 | inner arm proximal end |
| 30 | bushing |
| 32 | frame assembly |
| 34 | pinion gear, part of 32 |
| 36 | mirror |
| 38 | light emitting diode |
| 40 | frame rear cover |
| 42 | gear housing |
| 44 | rack gear |
| 48 | inner arm nesting section |
| 50 | biasing agent inner arm |
| 52 | insulating material |
| 54 | outer arm nesting section |
| 56 | biasing configuration outer arm |

DESCRIPTION OF PREFERRED EMBODIMENTS

Figure 6:
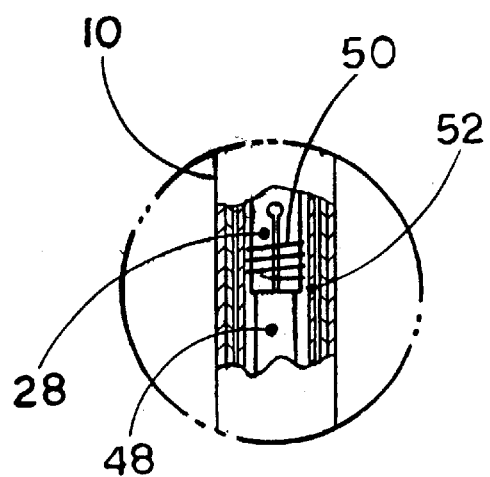
FIG. 6 is an enlarged cutaway view of the nesting sections.
Figure 1:
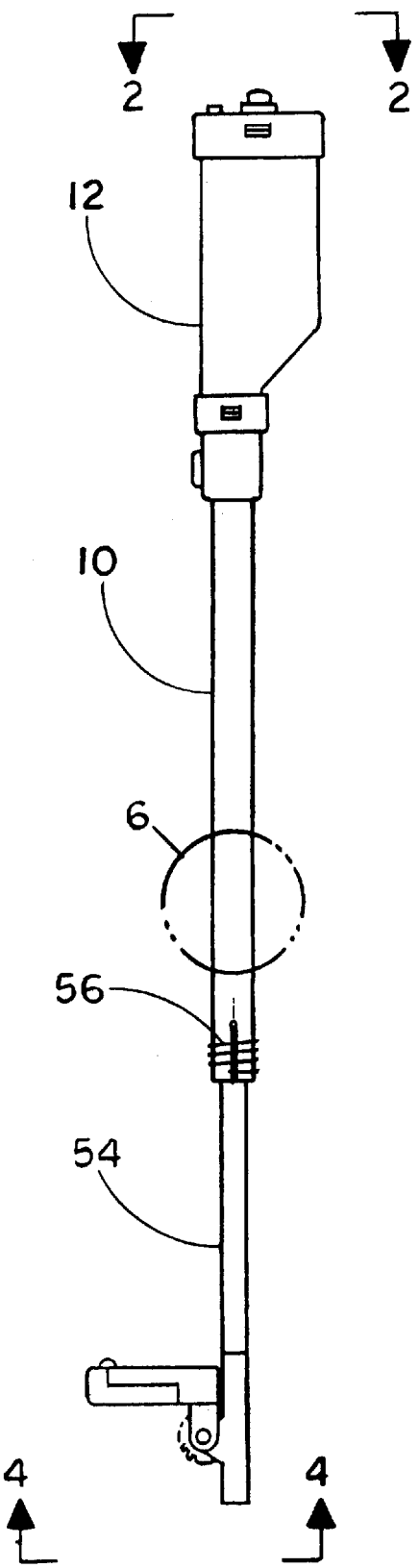
FIG. 1 is a side elevation of an exemplary telescoping probe.
Figure 2:
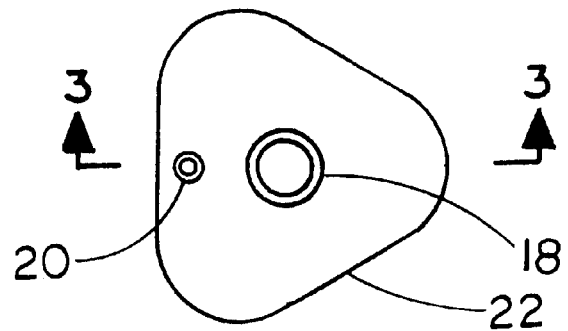
FIG. 2 is a proximal end view of the handle cap showing the optional outside power source connection and operating switch.
Figure 3:
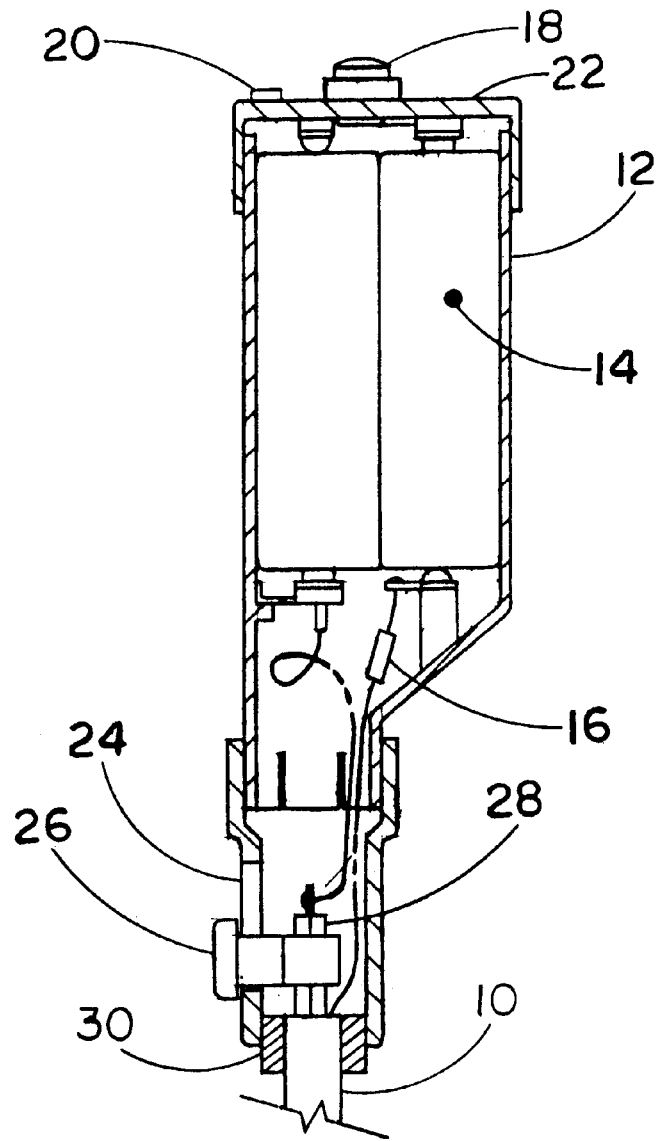
FIG. 3 is a cross sectional view of the handle.
Figure 5:
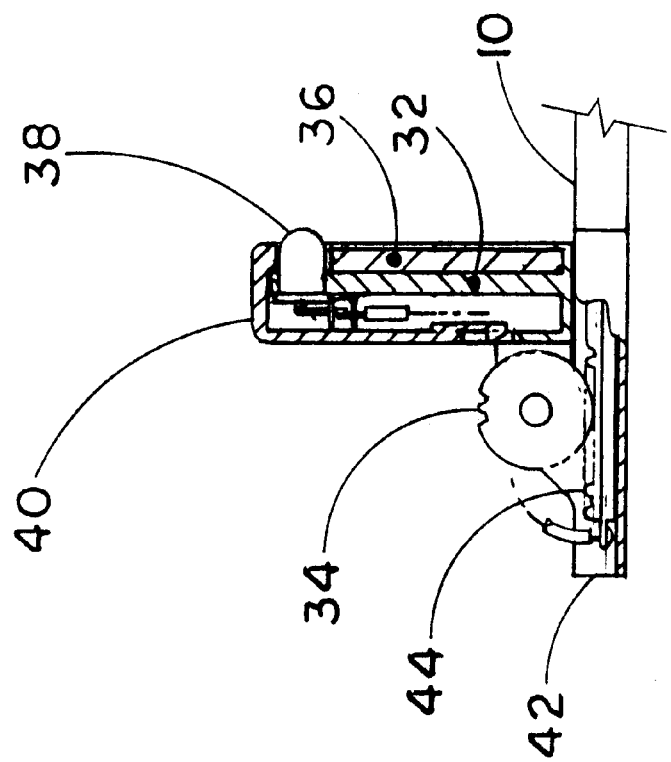
FIG. 5 is a cross sectional view of the frame assembly showing the position of the light emitting diode, the mirror and operating mechanism.
Figure 4:
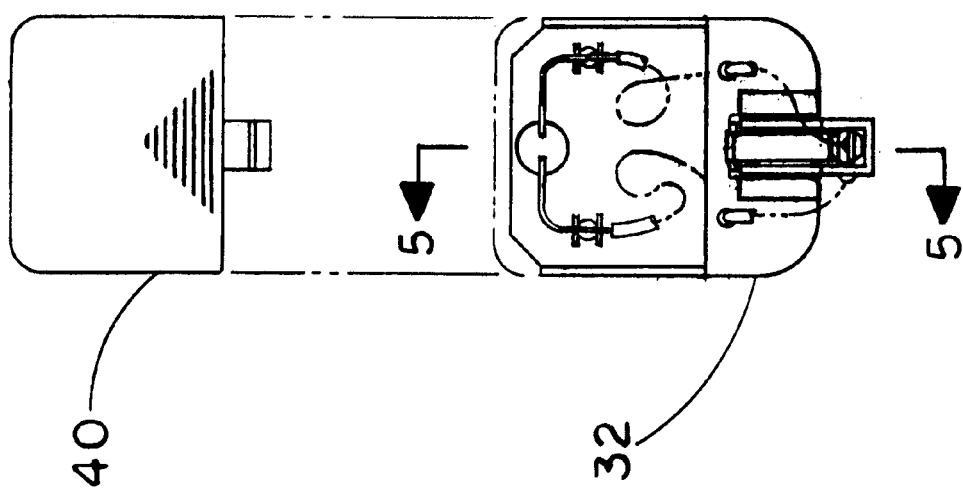
FIG. 4 is a distal view of the frame with the light emitting diode retaining cover removed.

A preferred embodiment of the telescoping probe of this invention is illustrated in FIG. 1, Referring to FIG. 1, the cross sectional view of the handle assembly 12, is shown in FIG. 3, the cross sectional view of the gear housing assembly 42 is shown in FIG. 5 in the event the telescoping feature is desired the nesting sections and a type of bias configuration is shown in an enlarged cutaway view as FIG. 6 The cross sectional view in FIG. 3, shows a handle configuration 12, containing batteries 14, an electronic regulating device 16, a switching device 18, a coupling device to an outside power supply 20, the proximal end having removable cap 22, The distal end of the handle 12, having an elongated slot 24, having an operating button 26, fitted slidingly within, The proximal end of the inner shaft 28, firmly attached to the operating button 26, a bushing 30, removable from the handle assembly 12, bushing 30, having an opening to firmly receive the outer shaft 10, Referring to FIG. 5, a frame assembly 32, an integral pinion gear 34, a removable mirror 36, a removable light emitting diode 38, a removable back cover 40, restraining the light emitting diode and wires, A gear housing 42, containing a rack gear 44, and the frame assembly 32, Referring to FIG. 6 an enlarged cut away view of the coaxial arm, having an inner arm 28, having a nesting extension 48, and a biasing configuration 50, an insulating material placed strategically 52, an outer arm 10, having a nesting extension 54, and a biasing configuration 56.

OPERATION

The operation of this inspection probe is similar to existing inspection probes, however the probe can be extended while not being fully removed from the part being inspected, both the light and the remote mechanism will continue to operate at any position this allows the inspector to compare different areas for comparison without withdrawing the probe. The light emitting diode being placed on the mirror frame making possible for the light to illuminate the exact area to be inspected. When inspecting chemical films for imperfections, a light emitting diode of a contrasting color can readily be installed thereby making the imperfections more visible, a magnifying mirror can readily be installed to make minor imperfections more visible. Until now the use of a fluorescent penetrant to inspect these areas was not possible, since the ultraviolet light could not be focused directly on the inspection area, now being able to readily replace the light emitting diode with an ultraviolet light emitting diode it is possible to inspect these hidden areas for cracks, pinholes ect, with the use of fluorescent penetrant material.

CONCLUSION

Accordingly it is obvious that the use of available inspection probes have not kept up with modem manufacturing techniques inspectors in the aerospace and nuclear industry use fluorescent dyes to examine the exterior surfaces, an expensive bore scope is available for small openings, however it caries an image based on white light.

The use of fluorescent penetrant dyes has even invaded the automotive industry, as in the use of finding leaks as in air conditioning systems. Technicians try holding a bulky ultraviolet light and a mirror probe in an area that is out of the line of sight can also appreciate the benefit from this new probe.

What is claimed is:

1. A professional hand held probe apparatus with interchangeable mirrors and light emitting diodes having a telescoping and non-telescopic features, and having a proximal end and a distal end, said probe comprising:

a first assembly of a handle configuration positioned at the proximal end of the probe;

a second assembly of a coaxial configuration occupying at the intermediate position of the probe; and a third assembly of a frame configuration for holding said interchangeable mirrors and light emitting diodes, said third assembly positioned at the distal end of the probe;

said first assembly having a first part with hollow structure to accommodate a plurality of batteries for inside electrical power source and an electronic voltage regulator, a removable cap positioned on said hollow structure of said first assembly, said removable cap having an electrical fitting configured to receive an outside electrical power source, and a switch positioned on said removable cap for turning on or off either one of said electrical power sources;

said first assembly having a second part with conical shape, said conical shape being coupled with an elongated slot parallel with a center line, said elongated slot having a button assembly fitted slidingly within, said conical shape having a distal end terminating in a configuration to accept a proximal end of said second assembly;

said coaxial assembly comprised of an inner tubular section and an outer tubular section, said inner tubular section being isolated electrically from said outer section by an insulating material, said inner tubular section and said distal end of the first assembly firmly secured to said operating button, distal end of the second assembly firmly secured to a rack gear and made electrically conductive there through, said outer tubular section firmly secured to the distal end of said first assembly;

said coaxial assembly having a first configuration and a second configuration, wherein said first configuration of said inner tubular is singular, therefore non telescopic, and said outer tubular is singular, therefore telescopic.

2. The apparatus as claimed in claim 1, said inner section comprised of one or more nesting tubular sections, wherein said distal end and the nesting tubular section are firmly secured to said rack gear, said nesting sections biased so as to be able to transmit energy from said operating button to said rack gear and made electrically conductive therethrough, said outer tubular section comprised of one or more nesting tubular sections, wherein said outer nesting sections having a more severe bias so as not to be overcome by said bias of said inner tubular sections.

3. The apparatus as claimed in claim 1, a third configuration, said third configuration being a frame assembly, said frame assembly having a pinion gear as an integral part, said pinion gear pivotally installed into said gear housing, thereby engaging said rack gear allowing the frame assembly to be operated on a plane parallel to the center line, said frame assembly having a configuration allowing the interchange of light emitting diodes and the necessary wiring, said frame assembly having a locking cover retaining said light emitting diodes and wiring, said frame assembly configured to accept mirrors of different magnification factors.

* * * * *